United States Patent
Harada et al.

(10) Patent No.: US 10,688,950 B2
(45) Date of Patent: Jun. 23, 2020

(54) PRE-COLLISION CONTROL DEVICE

(71) Applicant: TOYOTA JIDOSHA KABUSHIKI KAISHA, Toyota-shi, Aichi (JP)

(72) Inventors: Tomoaki Harada, Toyota (JP); Tsunekazu Yasoshima, Nagoya (JP); Ryu Hatakeyama, Toyota (JP); Masataka Sugimoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 16/009,818

(22) Filed: Jun. 15, 2018

(65) Prior Publication Data

US 2018/0361973 A1 Dec. 20, 2018

(30) Foreign Application Priority Data

Jun. 16, 2017 (JP) .................. 2017-118301

(51) Int. Cl.
  *B60R 21/0134* (2006.01)
  *B60R 21/0132* (2006.01)
  *G01S 13/931* (2020.01)
(52) U.S. Cl.
  CPC .... *B60R 21/0134* (2013.01); *B60R 21/01332* (2014.12); *G01S 13/931* (2013.01); *G01S 2013/932* (2020.01)

(58) Field of Classification Search
  CPC .......... B60R 21/0134; B60R 21/01332; G01S 13/931; G01S 2013/932
  See application file for complete search history.

(56) References Cited

U.S. PATENT DOCUMENTS

2014/0218228 A1   8/2014 Noda
2018/0251092 A1*  9/2018 Lee .................. B60R 21/01338

FOREIGN PATENT DOCUMENTS

JP         2014-153874 A    8/2014

* cited by examiner

*Primary Examiner* — Todd M Melton
(74) *Attorney, Agent, or Firm* — Oliff PLC

(57) ABSTRACT

When an object detected by a sensor (20L, 20R) is not an unnecessary object and the object's collision probability index satisfies the predetermined condition, a pre-collision control ECU 10 performs a pre-collision control to prepare for a collision between an own vehicle and this object. The pre-collision control ECU determines that the object is the unnecessary object, when an initially detected location which is a location of the object in relation to the own vehicle when the sensor initially detected the object is in an unnecessary object area NA, and a velocity index value which represents a degree of a velocity change of an initial detected object whose the initially detected location is in the unnecessary object area does not fall within a predetermined range.

6 Claims, 5 Drawing Sheets

PRE-COLLISION CONTROL DEVICE

BACKGROUND OF THE INVENTION

Field of the Invention

The present invention relates to a pre-collision control device comprising a sensor which radiates/transmits a wireless medium and receives the wireless medium reflected by an object(s) to thereby detect the object(s), wherein the pre-collision control device performs a pre-collision control to prepare for a collision between an own vehicle and the object with a collision probability index satisfying a predetermined condition, when there is the object which satisfies the predetermined condition.

Hitherto, for example, as proposed in Japanese Patent Application Laid-open Nod. 2014-153874 (referring to paragraphs 0002, 0003, 0016, 0028, and 0029), a device (hereinafter referred to as a "conventional device") has been known, which specifies/identifies an object (virtual image object) which a radar sensor misdetects falsely/erroneously detects).

The conventional device specifies/identifies the virtual image object among the objects (radar objects) which the radar sensor detects according to the following viewpoints (A) and (B).

(A) When the radar object is present in a predetermined area where the virtual image object is likely to be present and that radar object does not correspond to an image object detected by an image sensor, a probability that the radar object is the virtual image object is high. On the other hand, when the radar object corresponds to the image object even if that radar object is present in the predetermined area, the probability that the radar object is the virtual image object is low.

(B) When the number of times that the radar object is determined to correspond to the image object is small, the probability that the radar object is the virtual image object is high. On the other hand, when the number of times that the radar object is determined to correspond to the image object is great, the probability that the radar object is the virtual image object is low.

As described above, the conventional device determines whether or not the radar object corresponds to the image object so as to determine whether or not the radar object is the virtual object. However, the image object may sometimes incorrectly be selected/extracted from an image taken by the image sensor. If the image object (to be compared with the radar image) has been selected/extracted incorrectly, the radar image does not correspond to the image object. Such selecting/extracting the incorrect image object decreases the accuracy in determining whether or not the radar object is the virtual image object.

In view of the above, it is desired that a device can select/identify an unnecessary object including the virtual image object among the radar objects accurately without using information obtained by the image sensor.

The present invention has been made to solve the problem described above. The present invention has an object to provide a pre-collision control device which improves the accuracy in selecting/identifying the unnecessary object among the objects detected by the sensor without using information obtained by the image sensor, to thereby decrease a probability of performing the pre-collision control with respect to the unnecessary object.

A pre-collision control device (hereinafter, referred to as "the present invention device") according to the present invention comprises:

a sensor (20L, 20R) for transmitting a wireless medium and receiving the wireless medium reflected by an object to thereby detect the object and acquire object information including a location of the object in relation to an own vehicle and a relative velocity of the object in relation to the own vehicle;

a performing unit (10, Steps 400 through 495) for performing, when an object is present with a collision probability index (time to collision TTC) obtained based on the object information and satisfying a predetermined condition among the object detected by the sensor ("Yes" at Step 455), a pre-collision control to prepare for a collision between the own vehicle and the object with the collision probability index satisfying the predetermined condition (Step 460); and a determining unit (10, Steps 500 through 595 shown in FIGS. 5 and 6) for determining whether or not the object detected by the sensor is an unnecessary object against which the performing unit need not to perform the pre-collision control, wherein, the performing unit is configured to perform the pre-collision control against the object when it is determined that the object is not the unnecessary object ("Yes" at Step 455, Step 460), the sensor is configured be able to detect an object which is present in a detectable area which includes a predetermined detection axis line segment (CL1, CL2) extending along a predetermined direction from the own vehicle and whose length from the sensor is equal to or shorter than a predetermined detectable length, and the determining unit is configure to determine that the object is the unnecessary object (Step 530), when an initially detected location which is a location of the object in relation to the own vehicle when the sensor initially detected the object is in an unnecessary object area (NA) which includes the detection axis line segment (CL1, CL2) and whose length from the sensor is equal to or shorter than a predetermined vicinity length shorter than the detectable length ("Yes" at Step 510), and a velocity index value which represents a degree of a velocity change of an initially detected object which is the object whose initially detected location is in the unnecessary object area does not fall within a predetermined range ("No" at Step 525, "No" at Step 535, "No" at Step 610).

The unnecessary object misdetected (falsely detected) by the sensor tends to be initially detected in the unnecessary object area, and a velocity of the unnecessary object tends to suddenly increase or decrease at one time point.

The present invention device determines that the object is the unnecessary object when the object's location when the sensor initially detected the object is in the unnecessary object area and the object's velocity index value does not fall within a predetermined range. Thus, the present invention device can specify the unnecessary object using the above described tendencies of the unnecessary object. Therefore, the present invention device can more accurately determine that the object is the unnecessary object which is misdetected by the sensor. Accordingly, the present invention device can reduce the probability of performing the pre-collision control against the unnecessary object.

According to an embodiment of the present invention device, the determining unit is configured to:

calculate an acceleration (Acn) of the initially detected object as the velocity index value based on the object information, every time a first predetermined time period elapses (Step 515); and determine that the velocity index value does not fall within the predetermined range, when at least one of accelerations calculated in a period from a time point a second predetermined time period longer than the first predetermined time period before a present time point to the present time point is equal to or greater than a first threshold acceleration (Ac1th) which is an upper limit of the predetermined range, or equal to or smaller than a second threshold acceleration (Ac2th) which is a lower limit of the predetermined range ("No" at Step 525, "No" at Step 535).

As described above, the velocity of the unnecessary object tends to suddenly increase or decrease at one time point. That is, the acceleration of the unnecessary object at one time point is unlikely to fall within the predetermined range. The embodiment of the invention device determines that the velocity index value does not fall within the predetermined range, when "at least one of accelerations calculated in a period from a time point a second predetermined time period longer than the first predetermined time period before a present time point to the present time point" is equal to or greater than a first threshold acceleration which is an upper limit of the predetermined range, or equal to or smaller than a second threshold acceleration which is a lower limit of the predetermined range. Thus, the embodiment of the present invention device can specify the unnecessary object using the above described tendency of the unnecessary object. Therefore, the embodiment of the present invention device can determine more accurately whether or not the object is the unnecessary object.

According to an embodiment of the present invention device, the determining unit is configured to:

calculate, as the velocity index value, a value corresponding to a ratio (An) of the velocity (Vn) of the initially detected object at the present time point to the velocity (Vini) of the initially detected object at a time point a predetermined third time period after a time point when the initially detected object was detected for the first time; and determine that the velocity index value does not fall within the predetermined range, when the ratio is equal to or greater than a first threshold ratio (An2th) which is an upper limit of the predetermined range, or equal to or smaller than a second threshold ratio (An1th) which is an lower limit of the predetermined range.

As described above, the velocity of the unnecessary object tends to suddenly increase or decrease at one time point. That is, the ratio of the velocity of the initially detected object at the one time point to the velocity of the initially detected object at a time point a predetermined third time period after a time point when the initially detected object was detected for the first time is unlikely to fall within the predetermined range. The embodiment of the present invention device determines that the velocity index value does not fall within the predetermined range, when the ratio is equal to or greater than the first threshold ratio of the upper limit of the predetermined range, or equal to or smaller than the second threshold ratio of the lower limit of the predetermined range. Thus, the embodiment of the present invention device can specify the unnecessary object using the above described tendencies of the unnecessary object. Therefore, the embodiment of the present invention device can more accurately determine whether or not the object is the unnecessary object.

According to an embodiment of the present invention device, the performing unit is configured to determine that the collision probability index of the object satisfies the predetermined condition, when a time period (time to collision TTC) which it takes for the object detected by the sensor to collide with the vehicle is equal to or shorter than a threshold time period (T1th).

According to the above embodiment, when the time period which it takes for the object detected by the sensor to collide with the own vehicle is equal to or shorter than the threshold time period, it is determined that the object satisfies the predetermined condition so that the pre-collision control is performed. Therefore, the above embodiment can accurately specify the object with a high probability of a collision with the own vehicle.

According to an embodiment of the present invention device, the determining unit is configured to set the unnecessary object area to only one rectangle-shape area or an area formed by merging a plurality of rectangle-shape areas (NAR1, NAR2, NAL1, NAL2).

In the above embodiment, the unnecessary object area becomes a simple shape. Therefore, a processing load to execute a determination process of the unnecessary object can be reduced.

According to an embodiment of the present invention device, the sensor is configured to set the detection axis line segment (CL1, CL2) to an axial line segment extending along a diagonally forward direction from the own vehicle, and the determining unit is configured to set the unnecessary object area to an area defined by two side lines parallel with a front-rear direction of the own vehicle and two side lines parallel with an width direction of the own vehicle.

In the above embodiment, the unnecessary object area becomes a simple shape. Therefore, a processing load to execute a determination process of the unnecessary object can be reduced.

In the above description, in order to facilitate the understanding of the invention, reference symbols used in embodiment of the present invention are enclosed in parentheses and are assigned to each of the constituent features of the invention corresponding to the embodiment. However, each of the constituent features of the invention is not limited to the embodiment as defined by the reference symbols. Other objects, other features, and attendant advantages of the present invention will be readily appreciated from the following description of the embodiment of the invention which is made with reference to the accompanying drawings.

DESCRIPTION OF THE EMBODIMENTS

A pre-collision control device (hereinafter referred to as a "control device") according to one embodiment of the present invention will next be described with reference to the drawings. A vehicle in which the control device is mounted/installed is referred to as an "own vehicle SV", when this vehicle needs to be distinguished from other vehicles.

Figure 1:
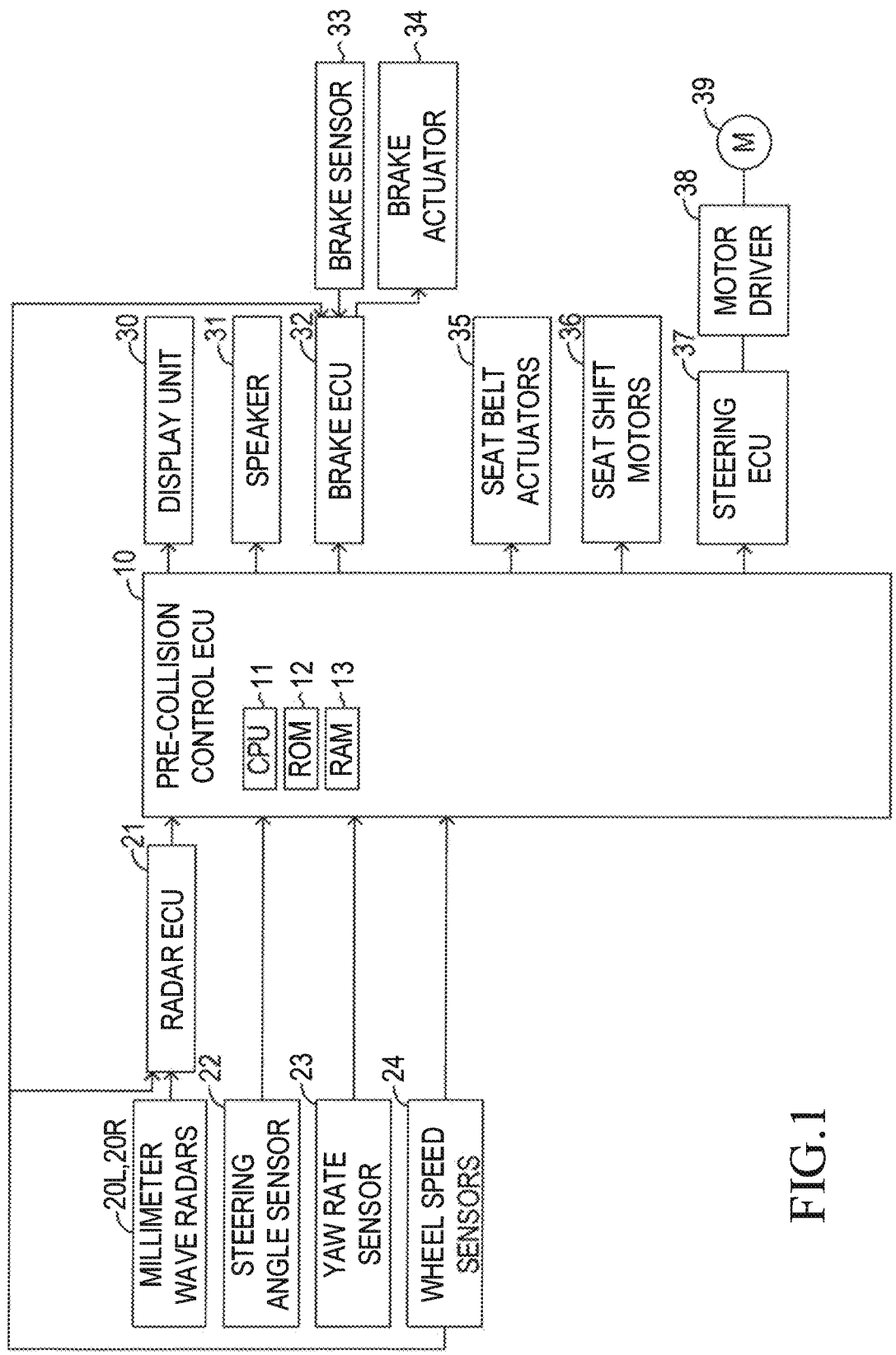
FIG. 1 is a schematic configuration diagram for illustrating a pre-collision control device (the present control device) according to an embodiment of the present invention.

As shown in FIG. 1, the control device comprises sensors which are millimeter wave radars 20L and 20R, to detect an object(s). The control device specifies/selects an unnecessary object(s) among the object(s) detected by the sensors. When the object(s) except the unnecessary object includes the object which satisfies a predetermined condition, the control device performs a pre-collision control to prepare for a collision between the object and the own vehicle.

The pre-collision control includes six (types of) control(s) as follows.

(1) A waring control including at least one of a screen displaying control and a sound outputting/generating control. The screen displaying control is for displaying a warning screen which warns/alerts a driver of the object before the collision between the own vehicle SV and the object. The sound outputting control is for outputting/generating a warning sound which warns/alerts the driver of the object before the collision.

(2) A brake assist control, for changing a status of a brake ECU 32 (referring to FIG. 1) described later to a brake assist status where the brake ECU 32 adds a predetermined force to a brake force caused by a depressing force to the brake pedal by the driver when the driver operates the brake pedal, to thereby generate the maximum brake force.

(3) A seat belt assist control, for rolling up a seat belt(s) before the collision, to thereby take up the slack of the seat belt, so as to prepare for the collision.

(4) A seat position control, for moving a seat(s) of the own vehicle SV to a "predetermined position (a collision preparation position) to be able to minimize damage which will be caused by the collision".

(5) A collision preventing brake control, for decreasing velocity/speed of the own vehicle SV using braking before the collision in order to prevent the collision and/or to decrease a speed (collision velocity) between the own vehicle SV and the object at a time point when the own vehicle SV and the object collide with each other.

(6) A collision preventing steering control, for changing a steering angle of the own vehicle SV automatically in order to prevent the collision.

It should be noted that the above controls (1) through (6) are performed in order of the control (1) to the control (6).

The control device comprises a pre-collision control ECU 10. It should be noted that an ECU is an abbreviation of an "Electronic Control Unit" which includes a microcomputer as a main part. The microcomputer of the ECU 10 includes a CPU 11 and memories (for example, a ROM 12, a RAM 13, and the like). The CPU 11 achieves various functions through executing instructions (program, routine) stored in the ROM 12.

The control device further includes the millimeter wave radars 20L and 20R, a radar ECU 21, a steering angle sensor 22, a yaw rate sensor 23, wheel velocity sensors 24, a display unit 30, a speaker 31, a brake ECU 32, brake sensors 33, a brake actuator 34, seat belt actuators 35, seat moving motors 36, a steering ECU 37, a motor driver 38, and a steering motor (M) 39. The millimeter wave radars 20L and 20R are collectively referred to as "the millimeter wave radars 20", when they need not to be distinguished from each other. The pre-collision control ECU 10 is connected to the radar ECU 21, the steering angle sensor 22, the yaw rate sensor 23, the wheel velocity sensors 24, the display unit 30, the speaker 31, the brake ECU 32, the seat belt actuators 35, the seat moving motors 36 and the steering ECU 37.

Each of the millimeter wave radars 20 detects a location/position of the object and a relative velocity/speed of the object in relation to the own vehicle SV, using a radio wave (wireless medium) in a millimeter waveband (hereinafter referred to as "millimeter wave"). In detail, each of the millimeter wave radars 20 radiates (transmits) the millimeter wave, and receive a millimeter wave (reflected wave) which is reflected by the object which is a three-dimensional object in a radiation range of the millimeter wave. Each of the millimeter wave radars 20 transmits "transmitted and received data" of the millimeter wave to the radar ECU 21 as a radar signal.

Figure 2:
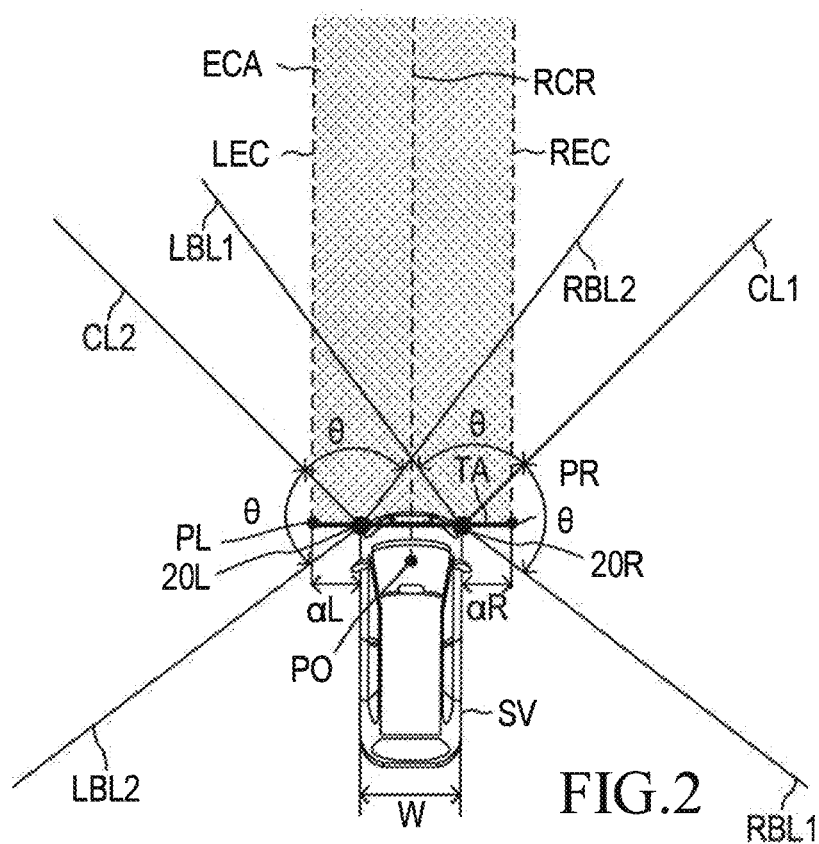
FIG. 2 is a diagram for illustrating arrangement locations and detectable areas of millimeter wave radars.

As shown in FIG. 2, the millimeter wave radar 20R is arranged at a right corner of a front edge of the own vehicle SV. The millimeter wave radar 20L is arranged at a left corner of the front edge of the own vehicle SV.

As shown in FIG. 2, a detectable area where the millimeter wave radar 20R can detect the object is a sector area between a right border line RBL1 in a right side of a detection axis CL1 and a left border line LBL1 in a left side of the detection axis CL1. A "magnitude of an angle formed between the detection axis CL1 and the right border line RBL1" is "θ", and a "magnitude of an angle formed between the detection axis CL1 and the left border line LBL1" is also "θ". Each magnitude "θ" of those angle is "82 deg". Therefore, a magnitude of a center angle of the sector area which is the detectable area of the millimeter wave radar 20R is "2θ". Thus, this magnitude is "164 deg".

A detectable area of the millimeter wave radar 20L is a sector area between a right border line RBL2 in a right side of a detection axis CL2 and a left border line LBL2 in a left side of the detection axis CL2, similarly to the detectable area of the millimeter wave radar 20R. A "magnitude of an angle formed between the detection axis CL2 and the right border line RBL2" is "θ", and a "magnitude of an angle formed between the detection axis CL2 and the left border line LBL2" is also "θ". Each magnitude "θ" of those angle is "82 deg". Therefore, a magnitude of a center angle of the sector area which is the detectable area of the millimeter wave radar 20L is "2θ". Thus, this magnitude is "164 deg".

Each of the millimeter wave radars 20 can detect the object which is present within a detectable length/distance which is "80 meters", Thus, a length/distance of each of the detection axes CL1 and CL2, a length/distance of the right border lines RBL1 and RBL2, and a length/distance of the left border lines LBL1 and LBL2 are "80 meters" respectively. However, entire lengths/distances of these axes and lines are not shown in FIG. 2 for the purpose of illustration.

As shown in FIG. 1, the radar ECU 21 is connected to the millimeter wave radars 20 and the wheel velocity sensors 24. The radar ECU 21 includes an unillustrated CPU and unillustrated memories (for example, a ROM, a RAM, and the like). The radar ECU 21 detects an object point(s) at which the millimeter wave is reflected and which is included in the object, based on the radar signal transmitted from each of the millimeter wave radars 20. The radar ECU 21 obtains the radar signal from each of the millimeter wave radars 20, every time a predetermined time period elapses, and determines whether or not the object point is present based on the obtained radar signal. When the object point is present, the radar ECU 21 calculates a distance/length between the object point and the own vehicle SV based on a time period from transmission of the millimeter wave to receipt of the reflected millimeter wave, and calculates a direction of the object point in relation to the own vehicle SV based on a direction of the reflected millimeter wave. The location/position of the object point in relation to the own vehicle SV is identified using the distance/length from the own vehicle SV to the object point and the direction of the object point in relation to the own vehicle SV.

Furthermore, the radar ECU 21 calculates a velocity of the object point. More specifically, the radar ECU 21 calculates a relative velocity of the object point in relation to the own vehicle SV based on frequency change (by the Doppler effect) of the reflected millimeter wave. The radar ECU 21 calculates a velocity Vs of the own vehicle SV based on a wheel pulse signal (described later) transmitted by each of the wheel velocity sensors 24. The radar ECU 21 calculates the velocity (a ground velocity, an absolute velocity) of the object point based on the relative velocity of the object point and the velocity of the own vehicle SV. The radar ECU 21 excludes/ignores the object point with the calculated velocity of "0". In other words, the radar ECU 21 does not recognize a stationary object as the object.

Thereafter, the radar ECU 21 transmits object point information signal to the pre-collision control ECU 10. The object point information signal includes presence/absence information indicating whether or not the object point is present. When the object point with the velocity faster than "0" is present, the object point information signal includes location/position information of the object point and relative velocity information of the object point. The location/position information includes the distance/length from the own vehicle SV to the object point, and the direction of the object point in relation to the own vehicle SV. This object point information signal includes neither the location/position of the object point with the velocity of "0" nor the relative velocity of the object point with the velocity of "0". Therefore, the pre-collision control ECU 10 does not recognize the object point with the velocity of "0".

The steering angle sensor 22 is a sensor for detecting a steering angle of a steering wheel (not shown). The steering angle sensor 22 detects the steering angle, and transmits the detected steering angle to the pre-collision control ECU 10 as a steering angle signal.

The yaw rate sensor 23 is a sensor for detecting a yaw rate generated in the own vehicle SV. The yaw rate sensor 23 detects the yaw rate, and transmits the detected yaw rate to the pre-collision control ECU 10 as a yaw rate signal.

Each of the wheel velocity sensors 24 is provided in the corresponding one of the wheels, Each of the wheel velocity sensors 24 detects predetermined number of pulse signals (wheel pulse signals) per one rotation of the corresponding one of the wheels. Thereafter, each of the wheel velocity sensors 24 transmits the detected wheel pulse signal to the pre-collision control ECU 10, every time each of the wheel velocity sensors 24 detects the wheel pulse signal. It should be noted that the pre-collision control ECU 10 calculates a rotation velocity (wheel velocity) of each of the wheels based on the number of the pulse signals which have been transmitted by the corresponding one of the wheel velocity sensors 24 per unit time period, Thereafter, the pre-collision control ECU 10 calculates the velocity Vs of the own vehicle SV based on the wheel velocity of each of the wheels.

The display unit 30 is a "Head Up Display" (hereinafter referred to as a "HUD") which receives display information from the ECUs in the own vehicle SV and a navigation device, and displays the received display information on a partial area (a display area) of a front glass of the own vehicle SV. The display unit 30 displays the warning screen when the display unit 30 receives an alert display command signal which is a display command of the warning screen from the warning ECU 10.

When the speaker 31 receives a warning sound outputting command signal which is an output command of the warning sound from the pre-collision control ECU 10, the speaker 31 outputs outputting the warning sound which warns the driver of the object in response to the received warning sound outputting command signal.

The brake ECU 32 is connected to the brake sensors 33 and each of the wheel velocity sensors 24. The brake ECU 32 receives detection signals transmitted from these sensors. The brake sensors 33 obtain parameters which the brake ECU 32 uses when the brake ECU 20 controls a brake device (not shown) installed in the own vehicle SV. The brake sensors 33 include a brake pedal operating amount sensor, and etc.

The brake ECU 32 is connected to the brake actuator 34. The brake actuator 34 is a hydraulic control actuator. The brake actuator 34 is provided in an unillustrated hydraulic circuit between an unillustrated master cylinder which pressurizes working oil by using the depressing force applied to the brake pedal and an unillustrated friction brake mechanism provided in each of the wheels. The brake actuator 34 adjusts oil pressure applied to the wheel cylinder. The brake ECU 32 drives the brake actuator 34 so as to have each of the wheels generate frictional braking force to thereby adjust the acceleration (a negative acceleration, i.e. a deceleration) of the own vehicle SV.

When the brake ECU 32 receives a brake assist command signal from the pre-collision control ECU 10, the brake ECU 32 changes the status of itself to the above mentioned brake assist status. When the brake ECU 32 receives a collision preventing brake signal from the pre-collision control ECU 10, the brake ECU 32 controls the brake actuator 34 to decrease the velocity of the own vehicle SV by braking before the collision with an obstacle specified/identified by this signal.

Each of the seat belt actuators 35 is for rolling each of the seat belts to thereby take up the slack of each of the seat belt. When each of the seat belt actuators 35 receives a seat belt assist command signal, each of the seat belt actuators 35 rolls each of the seat belts to thereby take up the slack of each of the seat belts, so as to prepare for the collision with the obstacle.

Each of the seat moving motors 36 is for shifting a position of the corresponding one of the seats of the own vehicle SV. When each of the seat moving motors 36 receives a seat position command signal from the pre-collision control ECU 10, each of the seat moving motors 36 rotates so as to shift the corresponding one of seats to the above described collision preparation position.

The steering ECU 37 is a controller of a well-known electric power steering system, and the steering ECU 37 is connected to the motor driver 38. The motor driver 38 is connected to the steering motor 39. The steering motor 39 is installed in an unillustrated "steering mechanism of the own vehicle SV including a steering wheel, a steering shaft connected to the steering wheel, a steering gear mechanism, or the like". The steering motor 39 generates torque by using electric power supplied from the motor driver 41. This torque is used for generating steering assist torque and for turning the left and right steered wheels.

When the steering ECU 37 receives a collision preventing steering signal from the pre-collision control ECU 10, the steering ECU 37 controls, through the motor driver 38 and the steering motor 39, the steering angle of the own vehicle SV to prevent the own vehicle from colliding with the obstacle specified/identified by the collision preventing steering signal.

<Outline of Operation>

An outline of the control device's operation will next be described. The control device selects, as an obstacle point(s), the object point(s) which has a high probability of colliding with the own vehicle among the object point(s) detected by the radar ECU 21. A detail of a determination process of the obstacle point will be described later in detail when describing Step 435 shown in FIG. 4.

Thereafter, the control device determines whether or not the obstacle point is the unnecessary point according to a process (a determination process of the unnecessary object point) described later. The unnecessary point is either of the following two types.

A first type of the unnecessary object point is the object point whose real location/position is different from the detected location/position detected by the radar ECU 21 (hereinafter, such object point is referred to as a "virtual image point").

A second type of the unnecessary object point is an object point detected as an object point included in the moving object by the radar ECU 21 despite that the object point is actually included in the stationary object. In other words, the second type of the unnecessary object point is the object point whose velocity is misdetected (erroneously detected) as a velocity faster than "0" despite that the actual velocity is "0".

The control device calculates time to collision TTC (a collision time period) which it takes for each of the obstacle points to collide with the own vehicle SV. A detail of a calculation process of the time to collision TTC will be described later in detail when describing Step 445 shown in FIG. 4. Then, the control device determines whether or not the time to collision TTC of each of the obstacle points is equal to or shorter than a threshold time period T1th.

Subsequently, the control device performs the pre-collision control, when there is the obstacle point which is not the unnecessary object point and whose time to collision TTC is equal to or shorter than the threshold time period T1th.

Now, the determination process of the unnecessary object point is described.

When the obstacle point satisfies both of the following conditions (1) and (2), the control device determines that the obstacle point is the unnecessary object point. It should be noted that the control device calculates an acceleration (a ground acceleration, an absolute acceleration) Ac of each of the obstacle points, every time a predetermined calculation time period elapses.

Condition (1): The location/position (an initially detected location/position) of the obstacle point when the obstacle point initially detected (for the first time) by the radar ECU 21 is present in a predetermined unnecessary object point area NA which is painted gray in FIG. 3.

Condition (2): At least one of the accelerations Ac is equal to or greater than a first threshold acceleration, or equal to or smaller than a second threshold acceleration. Each of the accelerations Ac is calculated every time a predetermined period longer than the calculation time period elapses in a "time period from at a time point before the present time point by a predetermined time period to the present time point".

The condition (1) is further described.

At first, the unnecessary object point area NA is described with reference to FIG. 3.

Figure 3:
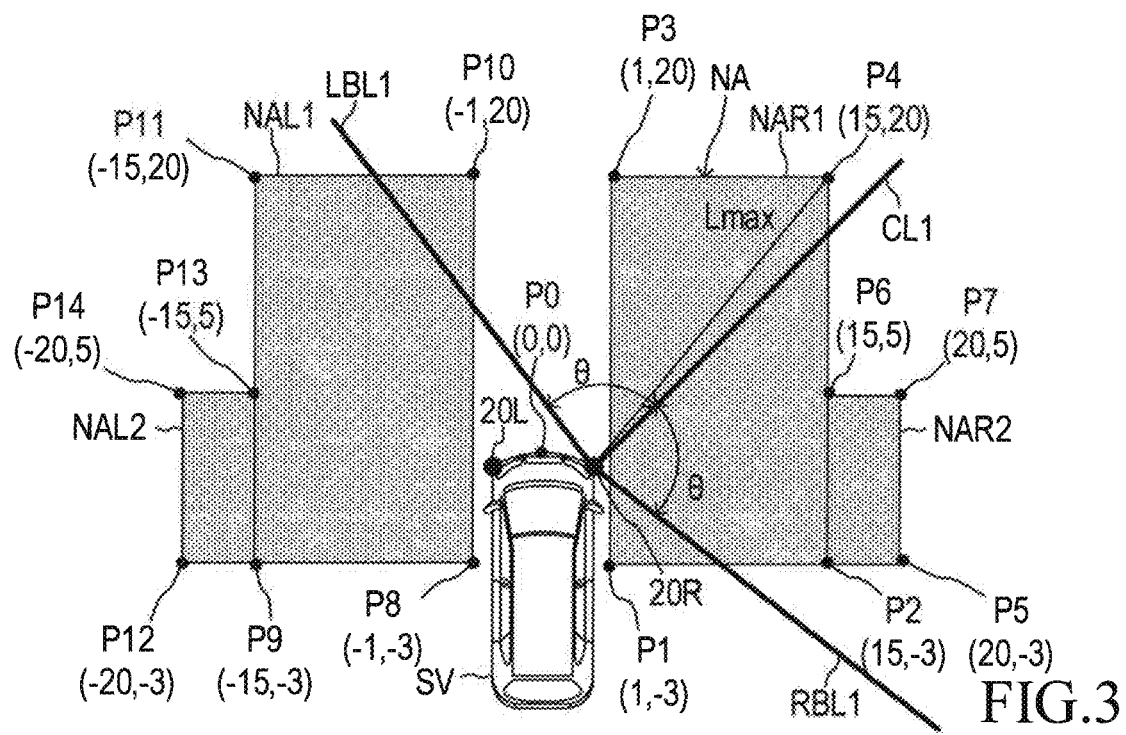
FIG. 3 is a diagram for illustrating an unnecessary object point area.

As shown in FIG. 3, the unnecessary object point area NA includes an "area formed by merging two areas NAR1 and NAR2" located in a right side of a right side face of the own vehicle SV and an "area formed by merging two areas NAL1 and NAL2" located in a left side of a left side face of the own vehicle SV.

The area NAR1 is set in the right side of the millimeter wave radar 20R. The area NAR1 is set to be a rectangle-shape area. The area NAR1 has two side lines parallel with a longitudinal axis of the own vehicle SV and whose lengths are "23 meters", and two side lines parallel with a width direction of the own vehicle SV and whose lengths are "14 meters". The area NAR2 is set to contact with a right side line between the two side lines of the area NAR1 parallel with the longitudinal axis of the own vehicle SV. The area NAR2 is set to be a rectangle-shape area. The area NAR2 has two side lines parallel with the longitudinal axis of the own vehicle SV and whose lengths are "8 meters", and two sidelines parallel with the width direction of the own vehicle SV and whose lengths are "5 meters". One of the two side lines of the area NAR2 parallel with the width direction of the own vehicle SV and one of the two side lines of the area NAR1 parallel with the width direction of the own vehicle SV are on a single straight line.

More specifically, the area NAR1 is the rectangle-shape area defined by points P1 through P4. Coordinates of the points P1 through P4 with "the origin located at a point P0 which is the center point in the width direction of the front end of the own vehicle SV" are described below. It should be noted that a unit used in the coordinates is a "meter". The right direction in the width direction of the own vehicle SV is set to a positive direction in an X coordinate of such coordinates, and the forward direction in the longitudinal direction of the own vehicle SV is set to the positive direction in a Y coordinate of such coordinates.

Point P1 (1, −3)
Point P2 (15, −3)
Point P3 (1, 20)
Point P4 (15, 20)

The area NAR2 is the rectangle-shape area defined by the point P2 and points P5 through P7. Coordinates of the points P5 through P7 are described below.

Point P5 (20, −3)
Point P6 (15, 5)
Point P7 (20, 5)

The area NAL1 is set in the left side of the millimeter wave radar 20L. The area NAL1 is set to be the rectangle-shape area. The area NAL1 has two side lines parallel with the longitudinal axis of the own vehicle SV and whose lengths are "23 meters", and two sidelines parallel with the width direction of the own vehicle SV and whose lengths are "14 meters". The area NAL2 is set to contact with a left side line between the two side lines parallel with the longitudinal axis of the own vehicle SV. The area NAL2 is set to be the rectangle-shape area. The area NAL2 has two side lines parallel with the longitudinal axis of the own vehicle SV and whose lengths are "8 meters", and two sidelines parallel with the width direction of the own vehicle SV and whose lengths are "5 meters". One of the two side lines of the area NAL2 parallel with the width direction of the own vehicle SV and one of the two side lines of the area NAL1 parallel with the width direction of the own vehicle SV are on a single straight line.

More specifically, the area NAL1 is the rectangle-shape area defined by points P8 through P11. Coordinates of the points P8 through P11 are described below.
Point P8 (−1, −3)
Point P9 (−15, −3)
Point P10 (−1, 20)
Point P11 (−15, 20)

The area NAL2 is the rectangle-shape area defined by the point P9 and points P12 through P14. Coordinates of the points P12 through P14 are described below.
Point P12 (−20, −3)
Point P13 (−15, 5)
Point P14 (−20, 5)

The most distant point from the millimeter wave radar 20R among the points included in the merged area formed by merging the area NAR1 and the area NAR2 is the point P4. The distance/length between the millimeter wave radar 20R and the point P4 is about "26 meters". As described above, the detectable distance/length is "80 meters". Therefore, the merged area includes the detection axis CIA included in the detectable area of the millimeter wave radar 20R. Furthermore, the merged area is included in an area whose length is equal to or shorter than one third of the detectable length. The unnecessary object point (the unnecessary object point of the first type) included in a virtual image tends to be suddenly detected in an area with a length shorter than the detectable length. In contrast, a real/regular object point tends to have been detected since the real/regular object point was firstly detected in an area with a length longer than the detectable length. In other words, a position/location (initial detection position/location) at which the unnecessary object point of the first type is firstly detected tends to be within an area with a length shorter than the detectable length. The merged area is set to be included in the area shorter than the detectable length in consideration of those tendencies. Therefore, the object point which is detected firstly/initially (for the first time) at a location which is in the merged area is likely to be the unnecessary object point of the first type.

It should be noted that a relationship between the millimeter wave radar 20L and "the merged area formed by merging the area NAL1 and the area NAL2" is the same as the relationship between the millimeter wave radar 20R and "the merged area formed by merging the area NAR1 and the area NAR2". Thus, when the initially detected location/position of the object point is in "the merged area formed by merging the area NAL1 and the area NAL2", that object point is likely to be the above-mentioned unnecessary object point (especially the unnecessary object point of the first type).

Now, the condition (2) is further described.
The control device reads out the object point information from the radar ECU 20, every time a predetermined time period (20 ms) elapses. In other words, this predetermined time period (20 ms) is one period/cycle to read out the object point information. Thereafter, the control device determines whether or not "the object point (the present object point) identified/specified by the object point information which is read out at the present time point" and "the object point(s) (the past object(s)) identified/specified by the object point information which was read out at the past time point(s)" are obtained/acquired from the same object. More specifically, the control device predicts the location/position of the object point at the present time point based on a location(s)/position(s) of the past object point(s) and a velocity of the past object point(s). When the present object point is present in a predetermined area/range with respect to the predicted location/position, the control device determines that the present object point and the past object point(s) are obtained from (or included in) the same object. In other words, the control device associates the present object point with the past object point(s).

Thereafter, the control device obtains the velocity (ground velocity) Vn of the present object point and "the velocity (ground velocity) Vn10 of the past object point which has been associated with the present object point and which was included in the object information read out at the time point 10 periods/cycles before the present time point". Then, the control device applies the obtained velocities Vn and V10 to the following equation (1) so as to obtain/calculate an acceleration Acn of the present object point.

$$Acn=(Vn-Vn10)/(10*20 \text{ ms}) \quad (1)$$

It should be noted that "20 ms" represents the period/cycle for the execution of this process.

The acceleration Acn can be either a positive value or a negative value. When the acceleration Acn is the negative value, a magnitude of the acceleration Acn represents a deceleration. However, the acceleration Acn of the negative value is referred to as the "acceleration" in this example. The control device calculates the acceleration Acn of the object point, every time the predetermined time period (20 ms) elapses.

Thereafter, the control device selects the maximum acceleration MaxAc and the minimum acceleration MinAc among "accelerations Acn through Acn100" which have been calculated from a time point 100 periods before the present time point to the present time point. The control device determines whether or not at least one of two conditions is satisfied. One of the two conditions is a condition satisfied when the maximum acceleration MaxAc is equal to or greater than a first threshold acceleration Ac1th. The other of the two conditions is a condition satisfied when the minimum acceleration MinAc is equal to or smaller than a second threshold acceleration Ac2th. The second threshold acceleration Ac2th is set to be smaller than the first threshold acceleration Ac1th.

Each of the first threshold acceleration Ac1th and the second threshold acceleration Ac2th is set to be an acceleration which cannot be calculated (or which is impossible) based on the movement of the real/regular object point. For example, the first threshold acceleration Ac1th is set to "6.0 m/s^2", and the second threshold acceleration Ac2th is set to "−6.0 m/s^2", taking into consideration that a magnitude of the acceleration of a vehicle is normally about "3.0 m/s^2".

Next, the reason why the control device determines that the object point is the unnecessary object point when both of the conditions (1) and (2) are established is described, focusing firstly on the unnecessary object point of the first type.

The unnecessary object point of the first type is detected as the object point detected at a (detected) location/position which is different from the real location/position of the object point due to radar virtual/false image of the object point. Such object point which is misdetected (falsely detected) due to the virtual/false image tends to be detected suddenly in the area with the length shorter than the detectable length by a predetermined length, based on the characteristics of the millimeter wave radar 20. In other words, such object point tends to be detected suddenly in a close/short range by the millimeter wave radar 20. Thus, the initially detected location/position of the unnecessary object point of the first type strongly tends to be in the unnecessary object point area NA. Therefore, the unnecessary object point of the first type is likely to satisfy the condition (1).

Further, the velocity of the unnecessary object point of the first type tends to be misdetected (erroneously acquired). For instance, the millimeter wave radar 20 misdetects the location/position of the unnecessary of the first type due to receiving the wave further reflected by a three-dimensional object in the vicinity of the own vehicle SV after the wave transmitted from the radar 20 has been once reflected by one object point. The frequency of such further reflected wave easily changes due to movement of the three-dimensional object reflecting the reflected wave or roughness of the surface of the three-dimensional object. Therefore, the velocity of the unnecessary object point of the first type is often misdetected. Accordingly, the unnecessary object point of the first type is likely to satisfy both of the conditions (1) and (2). The control device determines that the object point which satisfies both of the conditions (1) and (2) is the unnecessary object point of the first type.

Next, the unnecessary object point of the second type is further described. The velocity of the unnecessary object point of the second type is misdetected to be the velocity faster than "0", despite that the real velocity is "0". Such misdetected velocity is likely to change irregularly, because the velocity is misdetected. Therefore, at least one of the condition that the maximum acceleration MaxAc is equal to or greater than the first threshold acceleration and the condition that the minimum acceleration MinAc is equal to or smaller than the second threshold acceleration is likely to be established. Accordingly, the unnecessary object point of the second type is likely to satisfy the condition (2).

The initially detected location/position of the unnecessary object point of the second type is quite often outside of the unnecessary object point area NA. In this case, the magnitude of the velocity of the object point is likely to be accurately detected to be "0" until the object point reaches the unnecessary object point area NA. However, when the misdetection of the magnitude of the velocity occurs intermittently, the initially detected location/position of the unnecessary object point of the second type may be in the unnecessary object point area NA. Such unnecessary object point of the second type is likely to satisfy both of the conditions (1) and (2). Therefore, the control device determines that the object point which satisfies both of the conditions (1) and (2) is the unnecessary object point of the second type.

Furthermore, if the magnitude of the velocity of the object point of the second type is not accurately detected to be "0" until the object point reaches the unnecessary object point area NA, the magnitude of the velocity may be accurately detected while the object point is in the unnecessary object point area NA. In this case, the object point is determined to be the unnecessary object point, even if the object point does not satisfy both of the conditions (1) and (2).

<Specific Operation>

Figure 4:
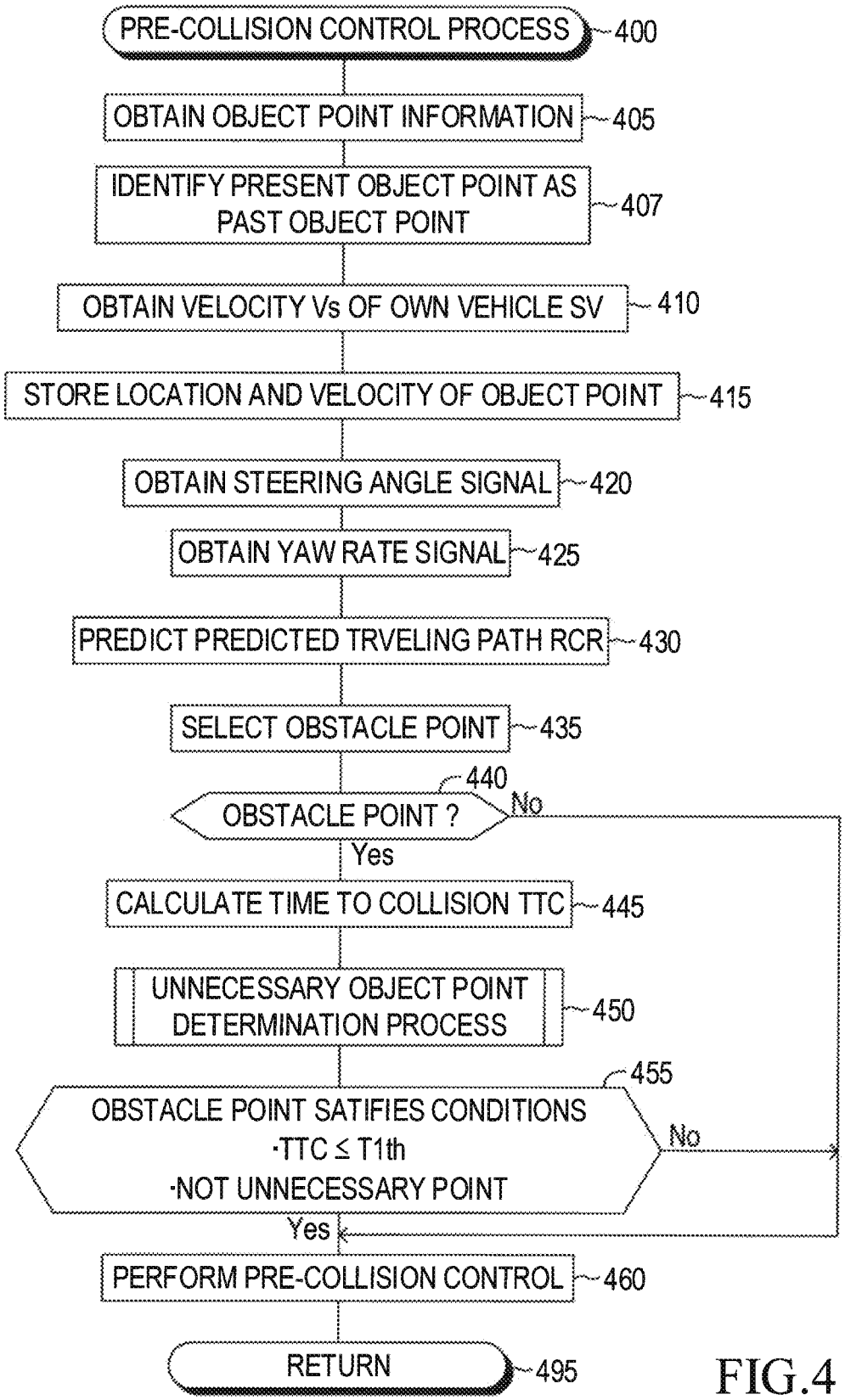
FIG. 4 is a flowchart for illustrating a routine which is executed by a CPU of a pre-collision control ECU illustrated in FIG. 1.

The CPU 11 of the pre-collision control ECU 10 executes a routine represented by a flow chart shown in FIG. 4, every time a predetermined time period (20 ms) elapses. The routine shown in FIG. 4 is for performing the pre-collision control. A period/cycle of the routine's execution (calculation interval) is "20 ms".

When a predetermined timing has come, the CPU 11 starts the process from Step 400 of FIG. 4, executes the following processes of Steps 405 through 435 in these order, and proceeds to Step 440.

Step 405: The CPU 11 obtains the object point information from the radar ECU 21.

Step 407: The CPU 11 attempts to associate the "present object point" with the "past object points." The present object point is an object point identified/specified by the location information included in the object point information obtained at Step 405 at present time point. The past object points are object points identified/specified by the location information included in the object point information obtained in a period from the time point before the present time point by a predetermined number of periods (10 periods) to the present time point".

More specifically, the CPU 11 predicts the location/position of the past object point at the present time point based on the velocities and the locations/positions of the past object points. When the location/position of the present object point is in the predetermined range determined based on the predicted location/position, the CPU 11 associates the present object point with the past object point.

Step 410: The CPU 11 obtains the velocity Vs of the own vehicle SV based on the wheel pulse signal from each of the wheel velocity sensors 24.

Step 415: When there is the past object point which is associated with the present object point at Step 407, the CPU 11 stores the location information, the velocity, and an obtained time which is the present time point into the RAM 13, with associating those with each other (i.e., the location information of the present object point, the velocity of the present object point, the obtained time, and the past object point). On the other hand, there is no past object point which is associated with the present object point at Step 407, the CPU 11 stores the location information, the velocity, and the obtained time of the present time point into the RAM 13, without associating the past object point with the location information of the present object point, the velocity of the present object point, and the obtained time. It should be noted that the velocity of the present object point stored into the RAM 13 is not the relative velocity of the present object point in relation to the own vehicle SV but is the absolute velocity (the ground velocity) of the present object point which is calculated based on the velocity Vs of the own vehicle SV obtained at Step 410 and the relative velocity of the present object point.

Step 420: The CPU 11 obtains the steering angle signal from the steering angle sensor 22.

Step 425: The CPU 11 obtains the yaw rate signal from the yaw rate sensor 23.

Step 430: The CPU 11 predicts a predicted traveling path RCR (referring to FIG. 2) of the own vehicle SV.

The process of Step 430 is described in detail. The CPU 11 calculates a turning radius of the own vehicle SV based on the velocity Vs of the own vehicle SV obtained at Step 410, and at least one of the steering angle represented by the steering angle signal obtained at Step 420 and the yaw rate represented by the yaw rate signal obtained at Step 425. Thereafter, the CPU 11 predicts, as the predicted traveling path RCR, a traveling path along which a center point in the width direction of the own vehicle SV (the center point PO (referring to FIG. 2) of a wheel axis connecting a left wheel and a right wheel) will move. When magnitude of the yaw rate is greater than "0", a shape of the predicted traveling path RCR is an arc. On the other hand, when the magnitude of the yaw rate is equal to "0", the CPU 11 predicts a strait traveling path along a direction of the acceleration generated in the own vehicle SV as the predicted traveling path RCR.

Step 435: The CPU 11 selects, as the obstacle point(s), the object point(s) which has (have) a high probability of colliding with the own vehicle SV, based on the location/position and the velocity of the object point(s), and the predicted traveling path RCR of the own vehicle SV. The selected obstacle may include an object which is predicted not to collide with the own vehicle SV but to have a narrow margin of clearance between the object and the own vehicle SV (or to extremely approach the own vehicle SV).

The process of Step 625 will next be described with reference to FIG. 2.

The CPU 11 predicts, based on the "predicted traveling path RCR", a predicted left traveling path LEC along which a left end PL of a vehicle-body of the own vehicle SV will move, and a predicted right traveling path REC along which a right end PR of the vehicle-body of the own vehicle SV will move. The predicted left traveling path LEC is a path obtained by a parallel shift of the predicted traveling path RCR to the left direction of the own vehicle SV by a "distance obtained by adding a half (W/2) of the vehicle-body width W to the predetermined distance αL". The predicted right traveling path REC is a path obtained by a parallel shift of the predicted traveling path RCR to the right direction of the own vehicle SV by a "distance obtained by adding a half (W/2) of the vehicle-body width W to the predetermined distance αR". Each of the distance αL and the distance αR is a distance which is longer than or equal to "0". The distance αL and the distance αR may be the same as each other, or may be different from each other. The CPU 11 specifies/designates, as a predicted traveling path area ECA, an area between the predicted left traveling path LEC and the predicted right traveling path REC.

The CPU 11 calculates/predicts a moving trajectory of each of the object points based on the locations of each of the past object points with which the present object point is associated. Then, the CPU 11 calculates/predicts a moving direction of each of the object points in relation to the own vehicle SV based on the calculated moving trajectory of each of the object points.

Thereafter, the CPU 11 selects/extracts, as one or more of the obstacle points which has/have a high probability of colliding with the own vehicle SV,
  one or more of the object points which has/have been in the predicted traveling path area ECA and which will intersect with a front end area TA of the own vehicle SV, and
  one or more of the object points which will be in the predicted traveling path area ECA and which will intersect with the front end area TA of the own vehicle SV,
based on the predicted traveling path area ECA, the relative relationship (the relative location and the relative velocity) between the own vehicle SV and each of the object points, and the moving direction of each of the object points in relation to the own vehicle SV. The front end area TA is an area represented by a line segment between the point PL and the point PR.

As described above, the CPU 11 predicts, as the predicted left traveling path LEC, the "trajectory/path along which the point PL will move", and predicts, as the predicted right traveling path REC, the "trajectory/path along which the point PR will move". Thus, "the object point which has been in the predicted traveling path area ECA and will intersect with the front end area TA of the own vehicle SV" may include an object point which is likely to pass near the left side or the right side of the own vehicle SV, and the "object point which will be in the predicted traveling path area ECA and will intersect with the front end area TA of the own vehicle SV" may include an object point which is likely to pass near the left side or the right side of the own vehicle SV. Accordingly, the CPU 11 can select/extract, as the obstacle point, the object point which has a probability of passing near the left side or the right side of the own vehicle SV.

Thereafter, the CPU 11 proceeds to Step 440, and determines whether or not at least one obstacle point has been selected at Step 435. When no obstacle point has been selected at Step 435, the CPU makes a "No" determination at Step 440, and proceeds to Step 495 to tentatively terminate the present routine. As a result, the CPU 11 does not perform the pre-collision control.

On the other hand, when at least one of the obstacle points has been selected at Step 435, the CPU 11 makes a "Yes" determination at Step 440, and proceeds to Step 445. At Step 445, the CPU 11 calculates the collision time period (time to collision) TIC which it takes for each of the selected obstacle points to intersect with the front end area TA of the own vehicle SV, and proceeds to Step 450.

Now, the calculation of the time to collision TTC of each of the obstacle points is described.

The CPU 11 obtains the time to collision TTC of one of the obstacle points through dividing the distance (the relative length) between the own vehicle SV and each of the obstacle points by the relative velocity of that one of the obstacle points in relation to the own vehicle SV.

The time to collision TIC is either one of a time period T1 or a time period T2, described below.

The time period T1 is a time (period) which it takes for the obstacle point to collide with the own vehicle SV (a time period from the present time point to a predicted collision estimation time point).

The time period T2 is a time (period) which it takes for the obstacle point which has the high probability of passing near either side of the own vehicle SV to reach the closest point to the own vehicle SV (a time period from the present time point to the time point at which the own vehicle SV the most closely approaches the obstacle point).

The time to collision TTC is a time which it takes for the obstacle point to reach the "front end area TA of the own vehicle SV" under an assumption that the obstacle point and the own vehicle SV move with keeping the relative velocity and the relative moving direction at the present time period.

Furthermore, the time to collision TTC represents a time period for which the control device is able to perform the pre-collision control to prepare for the collision with the "obstacle including the obstacle point", or a time period for which the driver is able to perform a collision preventing operation (driver's operation to prevent the collision). The time to collision TTC is a parameter representing an emergency degree, and corresponds to a necessity degree for the pre-collision control. In other words, as the time to collision TTC is shorter, the necessity degree for the pre-collision control is greater/higher, and, as the time to collision TTC is longer, the necessity degree for the pre-collision control is smaller/lower.

At Step 450, the CPU 11 executes an unnecessary object point determination process for selecting the unnecessary object point(s) among the obstacle points selected at Step 435. In actuality, when the CPU 11 proceeds to Step 450, the CPU 11 executes a subroutine represented by a flowchart shown in FIG. 5. The CPU 11 executes this subroutine for each of the obstacle points selected at Step 435.

Figure 5:
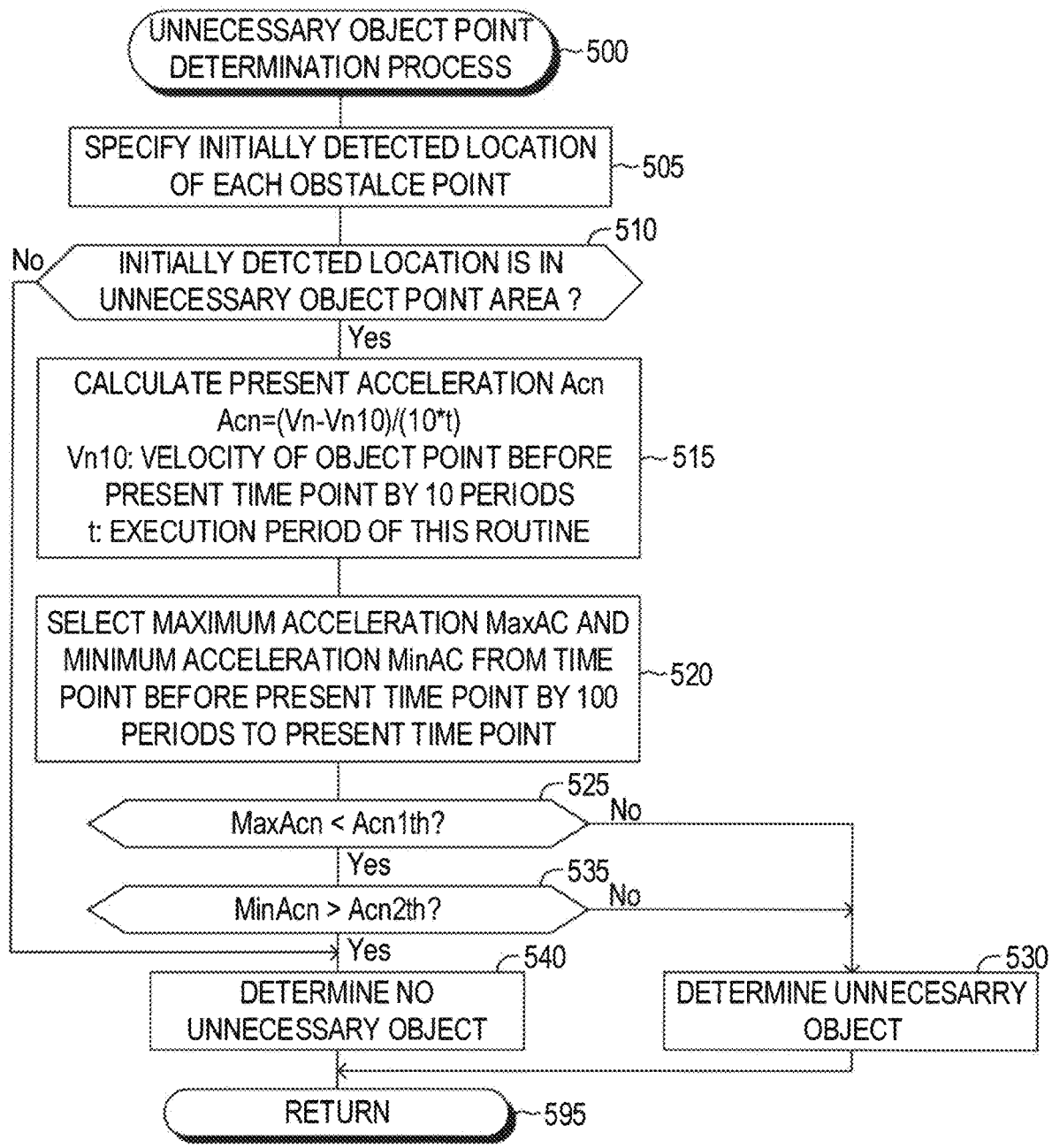
FIG. 5 is a flowchart for illustrating a routine which is executed by the CPU of the pre-collision control ECU when the CPU executes an unnecessary object point determination process illustrated in FIG. 4.

When the CPU 11 proceeds to Step 450, the CPU 11 starts the process from Step 500 shown in FIG. 5 and proceeds to Step 505. At Step 505, the CPU 11 refers to the location information of the object points, the velocity of the object points, and the obtained time of the object point information, which have been stored into the RAM 13 at Step 410 shown in FIG. 4, to specify the initial location/position (the initially detected location/position) of the object point selected as the obstacle point. The initially detected location/position of the object point is a location/position at which that object point was initially/firstly detected (for the first time).

Subsequently, the CPU 11 proceeds to Step 510 to determine whether or not the initially detected location/position specified at Step 505 is in/within the unnecessary object point area NA shown in FIG. 3.

When the initially detected location/position is not in the unnecessary object point area NA, in other words, when the initially detected location/position is outside of the unnecessary object point area NA, the CPU 11 makes a "No" determination at Step 510, and proceeds to Step 540 to determine that the obstacle object point whose initially detected location/position is outside of the unnecessary object point area NA is not the unnecessary object point. Thereafter, the CPU 11 proceeds to Step 595 to tentatively terminate the present routine, and proceeds to Step 455 shown in FIG. 4.

On the other hand, when the initially detected location/position is in/within the unnecessary object point area NA, the CPU 11 determines that the above-mentioned condition (1) is established. In this case, the CPU 11 makes a "Yes" determination at Step 510, and proceeds to Step 515 to calculate the acceleration Acn of the obstacle point at the present time point (the obstacle point being a point whose initially detected location/position is in the unnecessary object point area NA).

More specifically, the CPU 11 obtains the velocity (the ground velocity) Vn of "the obstacle point whose initially detected location/position is in the unnecessary object point area NA" at the present time point. Thereafter, the CPU 11 obtains the "velocity Vn10 of the past object point with which the present object point is associated" at the time point 10 periods before the present time point. Then, the CPU 11 applies the obtained velocities Vn and Vn10 to the above equation (1) so as to obtain/calculate the acceleration Acn.

When all of the velocities of the object point with which the present object point is associated for the past 10 periods are not stored, the CPU 11 obtains, in place of the velocity Vn10, the "velocity of the object point with which the present object point is associated" stored at the oldest time point.

Subsequently, the CPU 11 proceeds to Step 520 to select the maximum acceleration MaxAc and the minimum acceleration MinAc among the accelerations from the acceleration Acn through the acceleration Acn100. The acceleration Acn is the acceleration obtained at the present time point. The acceleration Acn100 is the acceleration obtained at the time point 100 of the periods (cycles) before the present time point. Then, the CPU 11 proceeds to Step 525.

When all of the velocities of the object point with which the present object point is associated for 100 of periods are not stored, the CPU 11 selects the maximum acceleration MaxAc and the minimum acceleration MinAc among all of the stored accelerations of that object point.

At Step 525, the CPU 11 determines whether or not the maximum acceleration MaxAc selected at Step 520 is smaller than the first threshold acceleration Ac1th. When the maximum acceleration MaxAc is equal to or greater than the first threshold acceleration Ac1th, the condition (2) is established. In this case, the CPU 11 makes a "No" determination at Step 525, and proceeds to Step 530. At Step 530, the CPU 11 determines that this obstacle point is the unnecessary object point, and proceeds to Step 595 to tentatively terminate the present routine. After that, the CPU 11 proceeds to Step 455 shown in FIG. 4.

When the maximum acceleration MaxAc is smaller than the first threshold acceleration Ac1th, the CPU 11 makes a "Yes" determination at Step 525, and proceeds to Step 535, At Step 535, the CPU 11 determines whether or not the minimum acceleration MinAc is greater than the second threshold acceleration Ac2th.

When the minimum acceleration MinAc is equal to or smaller than the second threshold acceleration AC2th, the condition (2) is established. In this case, the CPU 11 makes a "No" determination at Step 535, and proceeds to Step 530 to determine that this obstacle point is the unnecessary point. After that, the CPU 11 proceeds to Step 595 to tentatively terminate the present routine, and proceeds to Step 455 shown in FIG. 4.

On the other hand, when the minimum acceleration MinAc is greater than the second threshold acceleration Ac2th, the condition (2) is not established although the condition (1) is established. In this case, the CPU 11 makes a "Yes" determination at Step 535, and proceeds to Step 540 to determine that the obstacle point is not the unnecessary object point. After that, the CPU 11 proceeds to Step 595 to tentatively terminate the present routine, and proceeds to Step 455 shown in FIG. 4.

At Step 455 shown in FIG. 4, the CPU 11 determines whether or not both of two conditions are satisfied. One of the two is a condition which is satisfied when the time to collision TTC of the object point selected as the obstacle point at Step 435 is equal to or shorter than respective one of threshold time periods T1th(n). The other of the two is a condition which is satisfied when it is determined that the object point is not the unnecessary object point. The threshold time periods T1th(n) are described later.

When both of the conditions are established, the CPU 11 makes a "Yes" determination at Step 455, and proceeds to Step 460.

At Step 460, the CPU 11 performs the pre-collision control corresponding to the threshold time periods T1th(n), and proceeds to Step 495 to tentatively terminate the present routine.

The threshold time periods T1th(n) include threshold time periods T1th(1) through T1th(6). More specifically, the threshold time period T1th(1) is set to correspond to the warning control, the threshold time period T1th(2) is set to correspond to the brake assist control, the threshold time period T1th(3) is set to correspond to the seat belt assist control, the threshold time period T1th(4) is set to correspond to the seat position control, the threshold time period T1th(5) is set to correspond to the collision preventing brake control, and the threshold time period T1th(6) is set to correspond to the collision preventing steering control. As a value of "n" is greater, each of the threshold time periods T1th(n) is greater. The threshold time period T1th(1) is set to be the maximum value, and the threshold time period T1th(6) is set to be the minimum value.

When the time to collision TTC of the obstacle point which is not the unnecessary object point is equal to or smaller than at least one of the threshold time periods T1th(n), the CPU 11 makes a "Yes" determination at Step 455, and proceeds to Step 460. At Step 460, the CPU 11 executes the at least one of the processes corresponding to the at least one of the threshold time period T1th(n) which the time to collision TTC is equal to or smaller than, and proceeds to Step 495 to tentatively terminate the present routine.

More specifically, when the time to collision TTC of the obstacle point which is not the unnecessary object point is equal to or smaller than the threshold time period T1th(1) for the warning control, the CPU 11 transmits the alert display command signal to the display unit 30 at Step 460. In this case, the CPU 11 also transmits the alert generating command signal to the speaker 31.

When the display unit 30 receives the alert display command signal, the display unit 30 displays the warning screen to perform the warning control. When the speaker 31 receives the alert generating command signal, the speaker 31 outputs the warning sound to perform the warning control.

When the time to collision TTC of the obstacle point which is not the unnecessary object point is equal to or smaller than the threshold time period T1th(2) for the brake assist control, the CPU 11 transmits the brake assist command signal to the brake ECU 32 at Step 460. The brake ECU 32 changes the status of itself to the above mentioned brake assist status to perform the brake assist control.

When the time to collision TTC of the obstacle point which is not the unnecessary object point is equal to or smaller than the threshold time period T1th(3) for the seat belt assist control, the CPU 11 transmits the seat belt assist command signal to the seat belt actuators 35 at Step 460. When each of the seat belt actuators 35 receives the seat belt assist command signal, each of the seat belt actuators 35 rolls up the corresponding one of seat belts to perform the seat belt assist control.

When the time to collision TTC of the obstacle point which is not the unnecessary object point is equal to or smaller than the threshold time period T1th(4) for the seat position control, the CPU 11 transmits the seat position command signal to the seat moving motors 36 at Step 460. When each of the seat moving motors 36 receives the seat position command signal, each of the seat moving motors 36 rotates so as to move the corresponding one of the seats to the above described collision preparation position.

When the time to collision TTC of the obstacle point which is not the unnecessary object point is equal to or smaller than the threshold time period T1th(5) for the collision preventing brake control, the CPU 11 transmits the collision preventing brake signal to the brake ECU 32 at Step 460. The collision preventing brake signal includes the location information of the obstacle point with the minimum time to collision TTC among the obstacle points whose time to collision TTC is equal to or shorter than the threshold time period T1th(5) and which is not the unnecessary object point. When the brake ECU 32 receives the collision preventing brake signal, the brake ECU 32 calculates a target deceleration to decrease the velocity of the own vehicle SV before the collision with the obstacle including the obstacle point identified/specified by the location information included in the collision preventing brake signal. The brake ECU 32 decreases the velocity of the own vehicle SV through braking based on the calculated target deceleration.

When the time to collision TTC of the obstacle point which is not the unnecessary object point is equal to or smaller than the threshold time period T1th(6) for the collision preventing steering control, the CPU 11 transmits the collision preventing steering signal to the steering ECU 37 at Step 460. The collision preventing steering signal includes the location information of the obstacle point with the minimum time to collision TTC among the obstacle points whose time to collision TIC is equal to or shorter than the threshold time period T1th(6) and which is not the unnecessary object point. When the steering ECU 37 receives the collision preventing steering signal, the steering ECU 37 calculates a target steering angle to prevent the own vehicle from colliding with the obstacle including the obstacle point identified/specified by the location information included in the collision preventing steering signal. The steering ECU 37 controls the steering angle of the own vehicle SV to become the target steering angle through the motor driver 38 and the steering motor 39.

On the other hand, in a case where the time to collision TTC of the obstacle point selected at Step 435 shown in FIG. 4 which is not the unnecessary object point is longer than all threshold time period T1th(n), or in a case where the obstacle point selected at Step 435 is the unnecessary object point, when the CPU 11 executes the process of Step 455, the CPU 11 makes a "No" determination at Step 455, and proceeds to Step 495 to tentatively terminate the present routine. As a result, the CPU 11 does not perform the pre-collision control.

As understood from the above example, the control device determines that the object point whose initially detected location/position is in the unnecessary object point area NA and whose velocity index value does not fall within a predetermined range is the unnecessary object point. Thus, the control device can more accurately determine whether or not the object including the object point detected by the millimeter wave radars 20 is an unnecessary object including the unnecessary object point, without using the image object detected by the image sensor.

When the control device determines that the time to collision TTC of the object point which is not the unnecessary object point is equal to or shorter than at least one of the threshold time periods T1th(n), the control device performs "at least one of the controls corresponding to at least one of the threshold time periods T1th(n) which the time to collision TTC is equal to or shorter than" against this object point. Thus, the control device can prevent the pre-collision control from being performed against the unnecessary object. Therefore, with the control device, the probability that such pre-collision control with respect to the unnecessary object annoys the driver can be reduced.

Now, a modification example of the control device is described. The present modification example calculates, as the velocity index value, an increase-decrease ratio An of a velocity Vn of the object at the present time point in relation to an initial object velocity Vini of the object, and determine whether or not the object is the unnecessary object using the increase-decrease ratio An. The modification example and the control device are different in this respect. This respect is mainly described below.

Figure 6:
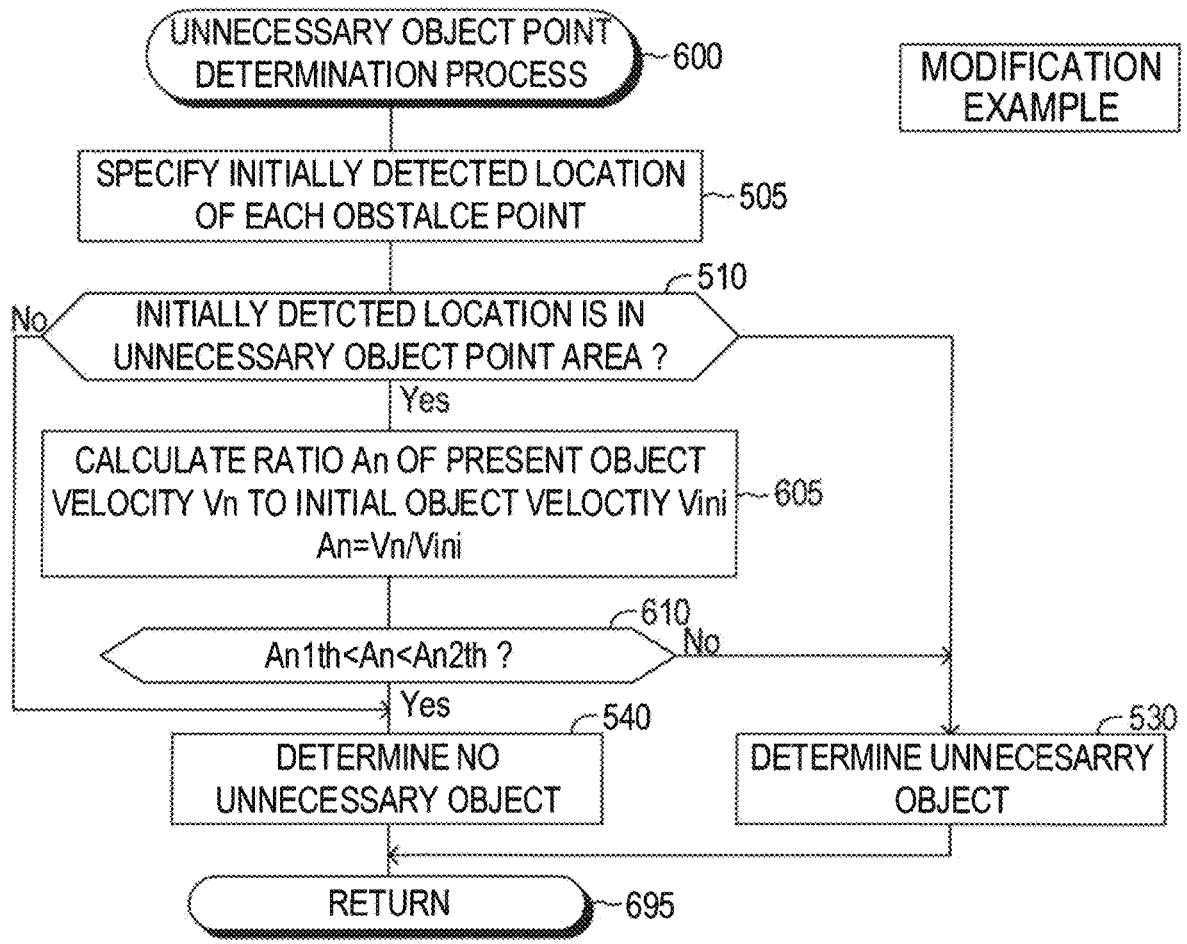
FIG. 6 is a flowchart for illustrating a routine which is executed by the CPU of the pre-collision control ECU when the CPU executes an unnecessary object point determination process of a modification example.

The CPU 11 of the present example executes a routine represented by a flowchart shown in FIG. 6 instead of the routine represented by the flowchart shown in FIG. 5. In FIG. 6, the same steps as the steps in FIG. 5 are denoted by common step symbols for the steps in FIG. 5, and description thereof is omitted.

When the CPU 11 proceeds to Step 450 shown in FIG. 4, the CPU 11 starts the process from Step 600 shown in FIG. 6. The CPU 11 specifies the initially detected location/position of each of the obstacle points at Step 505, and determines whether or not the initially detected location/ position is in the unnecessary object point area NA at Step 510. When the initially detected location/position is not in the unnecessary object point area NA, the CPU 11 makes a "No" determination at Step 510, and proceeds to Step 540 to determine that the object point is not the unnecessary object point. Thereafter, the CPU 11 proceeds to Step 695 to tentatively terminate the present routine, and proceeds to Step 455 shown in FIG. 4.

On the other hand, when the initially detected location/position is in the unnecessary object point area NA, the CPU 11 makes a "Yes" at Step 510, and proceeds to Step 605. At Step 605, the CPU 11 calculates the increase-decrease ratio An of "the velocity (the present object point velocity) Vn of the object at the present time point" to the initial object point velocity Vini of that object according to the following equation (2), and proceeds to Step 610.

$$An = Vn/Vini \qquad (2)$$

It should be noted that the initial object point velocity Vini is the velocity of the object point which is associated with the present object point at a time point three of the periods after the time point at which that object point was initially detected (for the first time).

When all of the velocities of that object point for three of the periods are not stored, the CPU 11 obtains, as the velocity Vini, the velocity of that object point at the time point when that object point was initially detected (for the first time).

At Step 610, the CPU 11 determines whether or not both of two conditions are satisfied. One of the two is a condition satisfied when the increase-decrease ratio An calculated at Step 605 is greater than a threshold ratio An1th. The other of the two is a condition satisfied when the increase-decrease ratio An is smaller than a threshold ratio An2th are established. The threshold ratio An2th is set to be greater than the threshold ratio An1th. When either of the conditions is established, the CPU 11 makes a "No" determination at Step 610 to proceed to step 530 at which the CPU determines that that object point is the unnecessary object point. Thereafter, the CPU 11 proceeds to Step 695 to tentatively terminate the present routine, and proceeds to Step 455 shown in FIG. 4.

On the other hand, when the increase-decrease ratio An is greater than the threshold ratio An1th and smaller than the threshold ratio An2th, the CPU 11 makes a "Yes" determination at Step 610, and proceeds to Step 540 to determine that the object point is not the unnecessary object point. Thereafter, the CPU 11 proceeds to Step 695 to tentatively terminate the present routine, and proceeds to Step 455 shown in FIG. 4.

As understood from the above, even if the control device of the present modification example uses the increase-decrease ratio An as the velocity index value, this control device can more accurately determine whether or not the object including the object point detected by the millimeter wave radars 20 is the unnecessary object which includes unnecessary object point, without using the image object detected by the image sensor.

The present invention is not limited to the above-mentioned embodiment and modifications, and can adopts various other modifications of the present invention. For instance, the above-mentioned embodiment and the above-mentioned modification example may be adopted in such a manner that they are combined with each other. More specifically, when the CPU 11 makes a "Yes" determination at Step 535 shown in FIG. 5, the CPU 11 executes the process of Step 605 shown in FIG. 6 to calculate the increase-decrease ratio An. Thereafter, the CPU 11 proceeds to Step 610 to determine whether or not both of the condition that the increase-decrease ratio An is greater than the threshold ratio An1th and the condition that the increase-decrease ratio An is smaller than the threshold ratio An2th are established.

When the CPU 11 makes a "Yes" determination at Step 610, the CPU 11 proceeds to Step 540 to determine that the obstacle point is not the unnecessary object point, proceeds to Step 595 to tentatively terminate the present routine, and proceeds to Step 455 shown in FIG. 4. On the other hand, when the CPU 11 makes a "No" determination at Step 610, the CPU 11 proceeds to Step 530 to determine that the obstacle point is the unnecessary object point, proceeds to Step 595 to tentatively terminate the present routine, and proceeds to Step 455 shown in FIG. 4.

In FIG. 3, it is described that the unnecessary object point area NA in the right side of the own vehicle SV is the area formed by merging a plurality of the rectangle-shape areas (the areas NAR1 and NAR2). However, the unnecessary object point area NA in the right side of the own vehicle SV may be a single rectangle-shape area. Further, the unnecessary object point area NA in the left side of the own vehicle SV may also be a single rectangle-shape area.

The display unit 30 is not limited to the HUD. The display unit 30 may be a Multi Information Display (MID), a touch panel of the navigation device, or the like. The MID is a display panel which is arranged on a dash board and which includes a speed meter, a taco meter, a fuel gauge, an water temperature gauge, an od/trip meter, an warning lump, and the like.

A sensor to detect the object may be a sensor which transmits a wireless medium and receives the reflected wireless medium to thereby detect the object. Therefore, such sensor may be an infrared radar or a sonar radar, instead of the millimeter wave radar 20.

The control device need not to performs all controls (1) through (6) as the pre-collision control. The control device may performs at least one of the controls (1) through (6) as the pre-collision control. Further, the pre-collision control may include an air bag process to optimize timing of deploying each of air bags included in the own vehicle SV. A threshold time period T1th(7) is set to be smaller than the threshold time period T1th(6) for the collision preventing steering control.

What is claimed is:

1. A pre-collision control device comprising:
a sensor for transmitting a wireless medium and receiving the wireless medium reflected by an object to thereby detect the object and acquire object information including a location of the object in relation to an own vehicle and a relative velocity of the object in relation to the own vehicle;
a performing unit for performing, when an object is present with a collision probability index obtained based on the object information and satisfying a predetermined condition among the object detected by the sensor, a pre-collision control to prepare for a collision between the own vehicle and the object with the collision probability index satisfying the predetermined condition; and
a determining unit for determining whether or not the object detected by the sensor is an unnecessary object against which the performing unit need not to perform the pre-collision control,
wherein, the performing unit is configured to perform the pre-collision control against the object when it is determined that the object is not the unnecessary object, the sensor is configured to be able to detect an object which is present in a detectable area which includes a predetermined detection axis line segment extending along a predetermined direction from the own vehicle and whose length from the sensor is equal to or shorter than a predetermined detectable length, and the determining unit is configure to determine that the object is the unnecessary object, when an initially detected location which is a location of the object in relation to the own vehicle when the sensor initially detected the object is in an unnecessary object area which includes the detection axis line segment and whose length from the sensor is equal to or shorter than a predetermined vicinity length shorter than the detectable length, and a velocity index value which represents a degree of a velocity change of an initially detected object which is the object whose initially detected location is in the unnecessary object area does not fall within a predetermined range.

2. The pre-collision control device according to claim 1, wherein
the determining unit is configured to:
calculate an acceleration of the initially detected object as the velocity index value based on the object information, every time a first predetermined time period elapses; and
determine that the velocity index value does not fall within the predetermined range, when at least one of accelerations calculated in a period from a time point a second predetermined time period longer than the first predetermined time period before a present time point to the present time point is equal to or greater than a first threshold acceleration which is an upper limit of the predetermined range, or equal to or smaller than a second threshold acceleration which is a lower limit of the predetermined range.

3. The pre-collision control device according to claim 1, wherein
the determining unit is configured to:
calculate, as the velocity index value, a value corresponding to a ratio of the velocity of the initially detected object at the present time point to the velocity of the initially detected object at a time point a predetermined third time period after a time point when the initially detected object was detected for the first time; and
determine that the velocity index value does not fall within the predetermined range, when the ratio is equal to or greater than a first threshold ratio which is an upper limit of the predetermined range, or equal to or smaller than a second threshold ratio which is an lower limit of the predetermined range.

4. The pre-collision control device according to claim 1, wherein
the performing unit is configured to determine that the collision probability index of the object satisfies the predetermined condition, when a time period which it takes for the object detected by the sensor to collide with the vehicle is equal to or shorter than a threshold time period.

5. The pre-collision control device according to claim 1, wherein
the determining unit is configured to set the unnecessary object area to only one rectangle-shape area or an area formed by merging a plurality of rectangle-shape areas.

6. The pre-collision control device according to claim 1, wherein,
the sensor is configured to set the detection axis line segment to an axial line segment extending along a diagonally forward direction from the own vehicle, and
the determining unit is configured to set the unnecessary object area to an area defined by two side lines parallel with a front-rear direction of the own vehicle and two side lines parallel with an width direction of the own vehicle.

* * * * *